Figure 1:
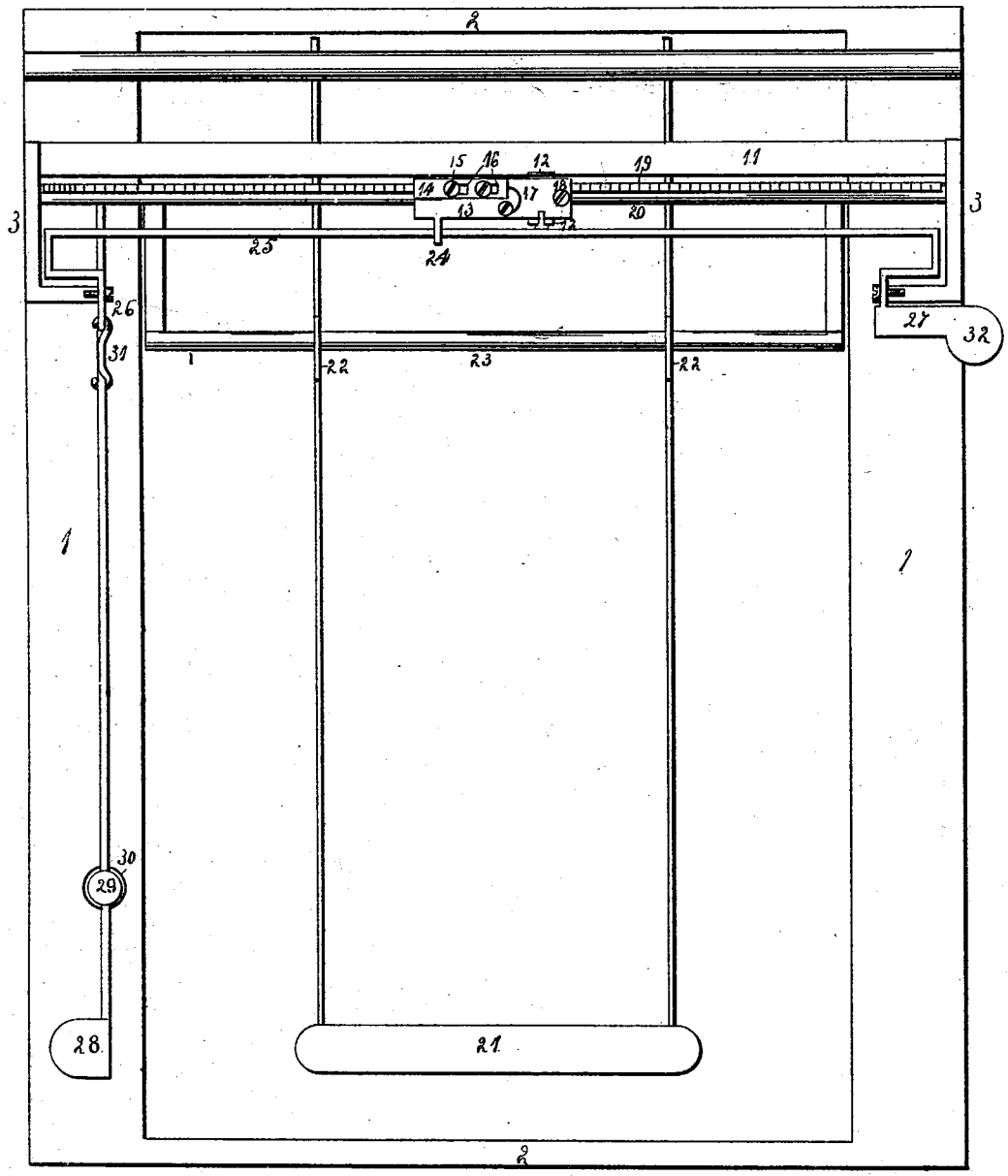

(No Model.)　　　　　　S. L. CONDÉ.　　　2 Sheets—Sheet 1.
TYPE WRITING MACHINE.

No. 514,912.　　　　　　　　　Patented Feb. 20, 1894.

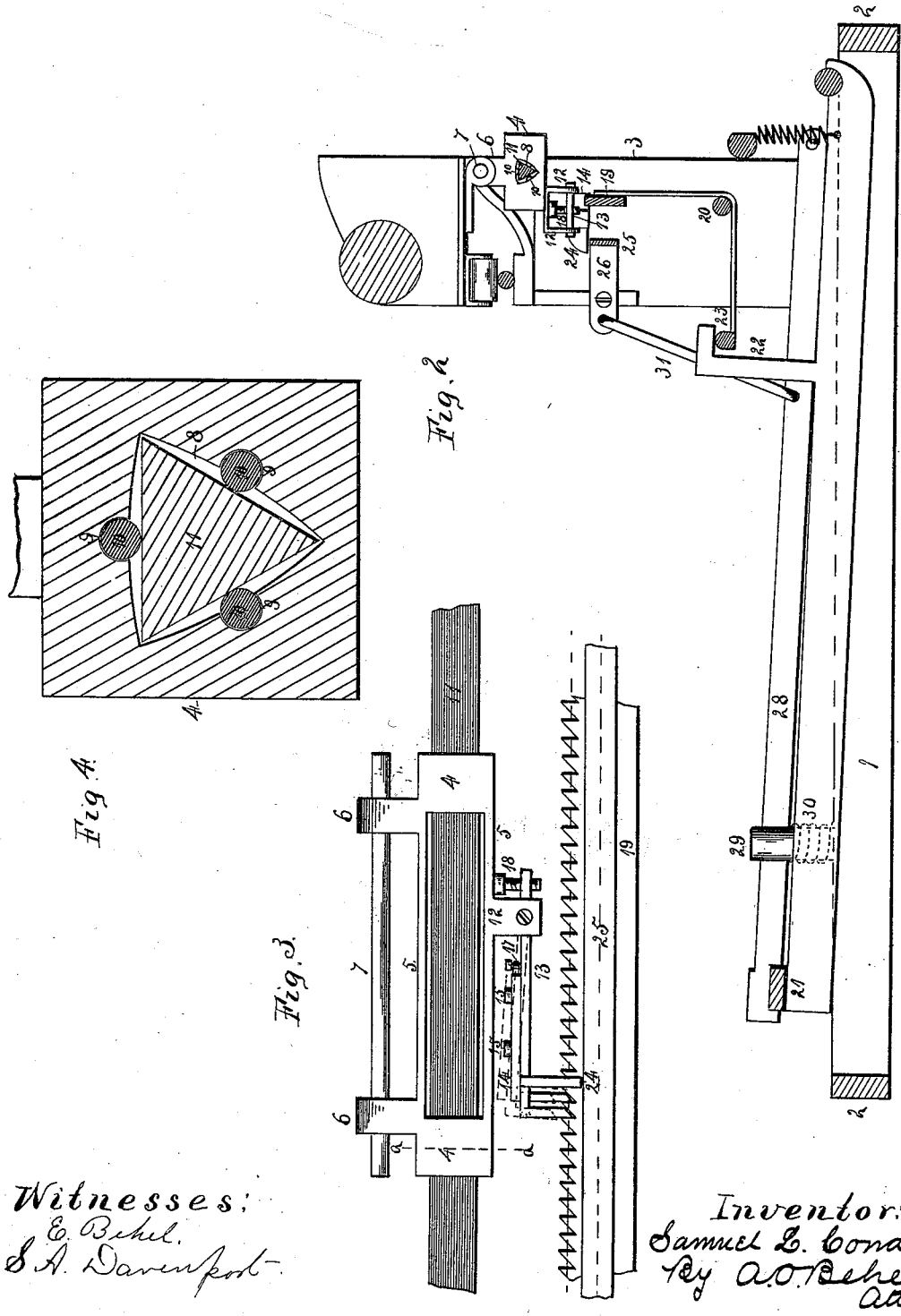

UNITED STATES PATENT OFFICE.

SAMUEL L. CONDÉ, OF ROCKFORD, ILLINOIS.

TYPE-WRITING MACHINE.

SPECIFICATION forming part of Letters Patent No. 514,912, dated February 20, 1894.

Application filed April 29, 1893. Serial No. 472,444. (No model.)

*To all whom it may concern:*

Be it known that I, SAMUEL L. CONDÉ, a citizen of the United States, residing at Rockford, in the county of Winnebago and State of Illinois, have invented certain new and useful Improvements in Type-Writing Machines, of which the following is a specification.

The object of this invention is to release the paper carriage feed-mechanism by a key located in close proximity to the key board.

In the accompanying drawings, Figure 1, is a plan view of such portions of a typewriting machine with which my improvements have a connection. Fig. 2, is a vertical lengthwise section. Fig. 3, is an elevation of the escapement. Fig. 4, is a transverse section on dotted line *a* Fig. 3.

The main frame consists of the sides 1, and ends 2. Brackets 3, rise from the side bars near their rear ends. The paper carriage is supported at its front in any suitable manner and at its rear upon an angular bar 11 connecting the brackets. The truck for supporting the carriage on the bar 11 consists of ends 4, connected by top and bottom bars 5, and from the top bar rises ears 6, which are perforated and support a pin 7, forming the connection between the trunk and carriage. The ends of the truck are provided with openings 8, extending in the lengthwise direction of the truck. The openings are three sided and in each of their inner faces is a countersink 9. Balls 10, are placed in the countersinks and lie in contact with the faces of the supporting bar 11, as shown at Fig. 4. By this arrangement, a rolling connection is formed between the carriage and its support.

From the under side of the lower bar 5, depend ears 12, between which is pivoted a dog 13, forming one of the dogs of the escapement and by this dog is supported a horizontal movable dog 14, guided in its movements by the screws 15, passing through slots 16. A spring 17, holds the movable dog at one end of its movement. A screw 18, having a screw-thread connection with the rear end of the dog 13, forms the means for regulating the vertical descent of the dogs.

A toothed rack 19, has a pivotal connection with the brackets 3, by a rod 20, acting as its pivot. This rack is in position to be engaged by the dogs 13, and 14, and movement is imparted thereto, by the keys and spacing bar 21, through the medium of hooks 22, engaging a universal bail 23, extending from its pivot. When the key or spacing bar is depressed the toothed rack will be rocked on its pivot, and moved from its engagement with the movable dog 14, into engagement with the dog 13, thereby allowing the movable dog to be moved by its spring 17 to a tooth in advance of the one in which it was last in engagement, and upon the release of the key or spacing bar, the rack will move into engagement with the movable dog, and the spring or power employed to move the paper carriage, will move the carriage until the dogs are in line, when the operation is again effected. From the front side of the dog 13, extends an arm 24.

Pivoted to the brackets 3 is a bar composed of the lengthwise portion 25, and right-angle arms 26 and 27. The lengthwise portion underlies the arm 24, extending from the dog 13.

A key 28, has a pivotal connection with the main frame at its rear end, and its front end is guided by a vertically slotted post 29. A spring 30, surrounds this post and rests against the under face of the key holding it elevated. A link 31, forms a connection between the key and the arm 26, of the release bar. By this arrangement the operator by depressing the key 28, moves the release bar upon its pivotal connection with the brackets, which will come in contact with the arm 24, raising the dogs from their engagement with the toothed rack, allowing the paper carriage to be moved toward the left hand of the machine, and this raising movement of the dogs can take place at any position of the paper carriage. The arm 27, has its free end provided with a thumb piece 32, by means of which the dogs can be raised to allow the movement of the carriage. I locate the key 28, close to the key board in order that the operator can release the carriage without raising his hand from the key board.

I claim as my invention—

1. In a type writing machine, the combination of the paper carriage, a toothed rack, an escapement supported by the carriage, a bar extending across the machine and having a pivotal connection therewith, a key having a connection with the bar and located in close proximity to the keyboard, the bar releasing the escapement from the rack upon operating the key.

2. In a type writing machine, the combination of a paper carriage, a toothed rack, an escapement supported by the carriage, a bar extending across the machine, having a pivotal connection therewith, one end extending beyond the face of the main frame forming a key, a key lever having a connection with the bar and located in close proximity to the keyboard, the bar releasing the escapement from the rack when operating the key or key lever.

3. In a type writing machine, the combination of a paper carriage, a triangular track supported by the carriage, a sliding truck connected to the carriage having triangular openings within which are cup shaped sockets, and balls located in the sockets bearing against the faces of the triangular track.

4. In a type writing machine, the combination of a paper carriage, a sliding truck to which the carriage is connected, a toothed rack, an arm depending from the truck, a dog having a pivotal connection with the arm, a dog having a sliding engagement with the pivotal dog, a projection extending from the pivoted dog, a bar extending across the machine underneath the projection, and a key connected with the arm, located in close proximity to the keyboard by which the dogs are raised from their engagement with the rack.

5. In a typewriting machine, a release key located on the upper surface of the main frame in close proximity to the keyboard, a slotted post forming a guide therefor, a spring surrounding the post and placed beneath the key, an escapement device for the paper carriage and a connection between the escapement and key.

6. An escapement for the paper carriage of a type-writing machine, consisting of a toothed rack and two dogs, one of which has a pivotal connection with the carriage, and supports the other, having a sliding engagement therewith, and an adjusting screw for the pivoted dog.

SAM L. CONDÉ.

Witnesses:
A. O. BEHEL,
E. BEHEL.